Sept. 8, 1936.  W. D. SARGENT  2,053,447
VEHICLE ATTACHMENT
Filed Aug. 15, 1933  4 Sheets-Sheet 1

INVENTOR
William D. Sargent,
BY
Redding, Greeley, &
HIS ATTORNEYS

Sept. 8, 1936.  W. D. SARGENT  2,053,447
VEHICLE ATTACHMENT
Filed Aug. 15, 1933  4 Sheets-Sheet 2

INVENTOR
William D. Sargent,
BY
Redding, Greeley, O'Shea & Campbell,
HIS ATTORNEYS

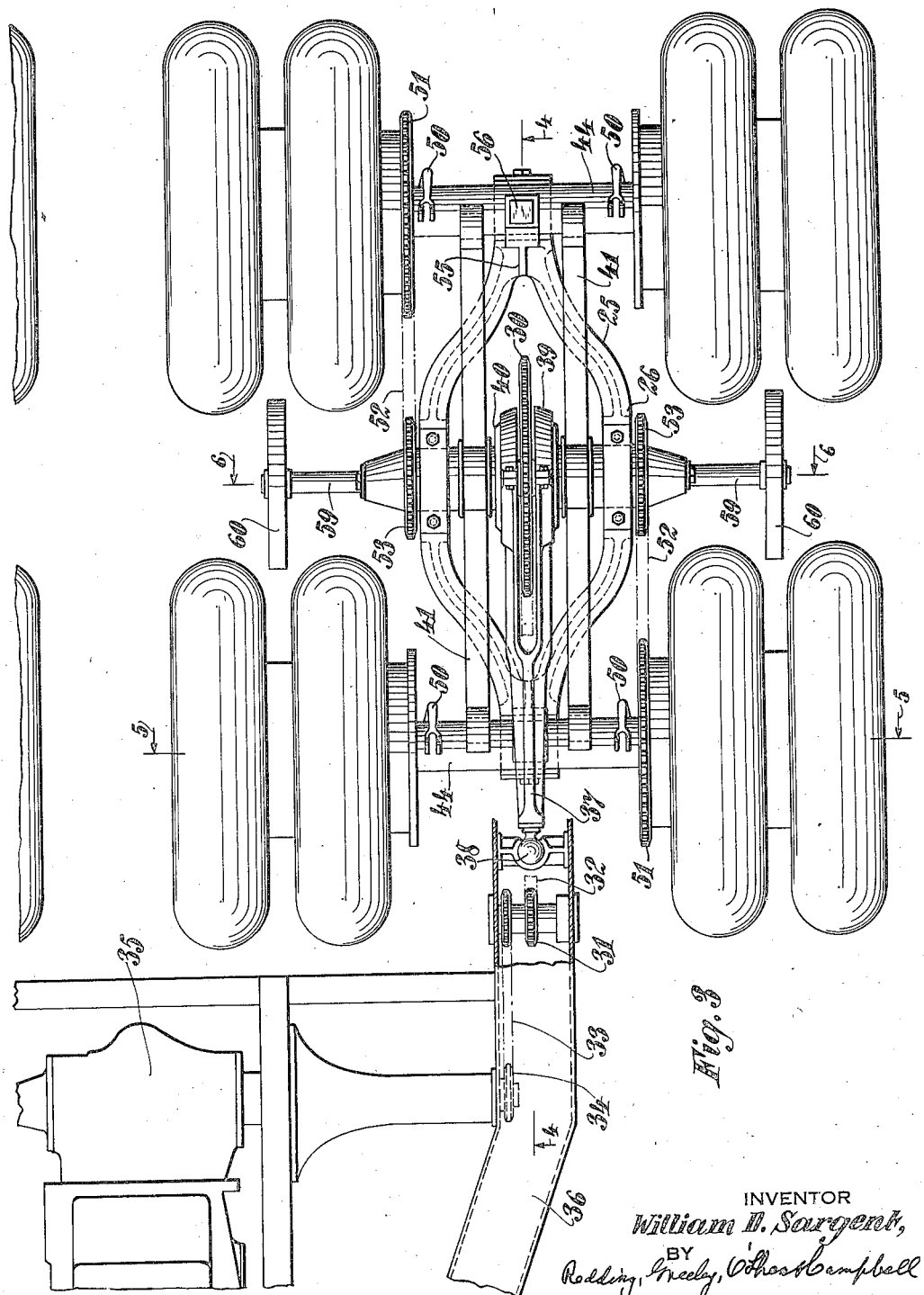

Sept. 8, 1936.   W. D. SARGENT   2,053,447
VEHICLE ATTACHMENT
Filed Aug. 15, 1933   4 Sheets-Sheet 4

INVENTOR
William D. Sargent,
BY
Redding, Greeley, O'Shea & Campbell,
HIS ATTORNEYS Patented Sept. 8, 1936

2,053,447

UNITED STATES PATENT OFFICE 2,053,447

VEHICLE ATTACHMENT

William D. Sargent, Newark, N. J.

Application August 15, 1933, Serial No. 685,286

6 Claims. (Cl. 305—8)

The present invention relates to vehicle attachments and embodies, more specifically, an improved form of wheel mounting by means of which the weight of a vehicle may be suitably apportioned between a plurality of supporting wheels in a constant and uniform manner, regardless of the position assumed by such wheel during operation.

A further object of the invention is to provide a wheel mounting for vehicles wherein a plurality of wheels may be mounted upon a vehicle and upon a common axis, the wheels being so mounted as to adapt the axes thereof to irregularities in the road surface.

A further object of the invention is to provide a wheel mounting wherein a plurality of wheels are mounted for movement about a common longitudinal axis passing between the planes of the wheels, such longitudinal axis being offset with respect to the central longitudinal axis of the vehicle.

A further object of the invention is to provide a wheel mounting of the above character wherein a plurality of wheels are mounted to swing about a common axis on the motor vehicle, the wheels further being provided with means to enable them to turn about axes at right angles to the first axis.

A further object of the invention is to provide a wheel unit for a motor vehicle wherein a plurality of wheels are mounted to swing in a plurality of planes, suitable driving means being provided to supply power from the frame of the vehicle to one or more of the wheels.

A further object of the invention is to provide a wheel mounting of the above character in combination with a track unit which is adapted to be mounted thereon.

Further objects of the invention will be apparent as it is described in further detail in connection with the drawings, wherein—

Figure 3 is a plan view, partly broken away and in section, showing a modified form of the invention wherein driving means is provided.

Figure 1:
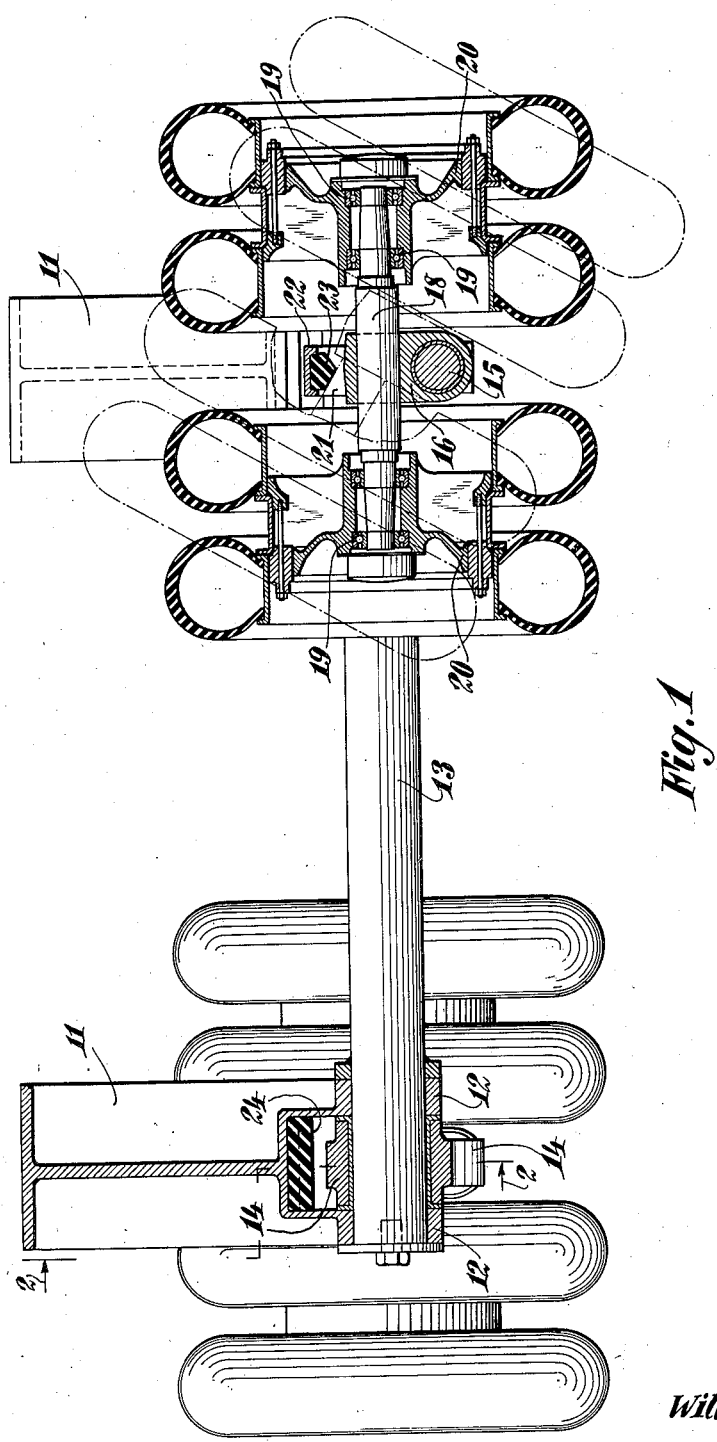
Figure 1 is a view in front elevation, partly broken away and in section, showing a wheel mounting constructed in accordance with the present invention.
Figure 2:
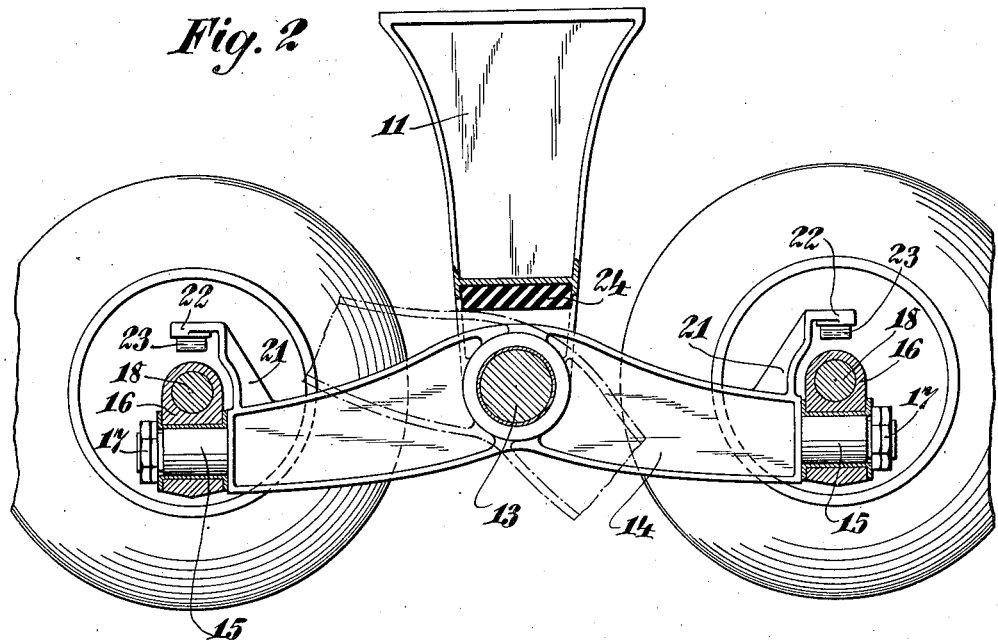
Figure 2 is a view in section, taken on line 2—2 of Figure 1, and looking in the direction of the arrows.
Figure 4:
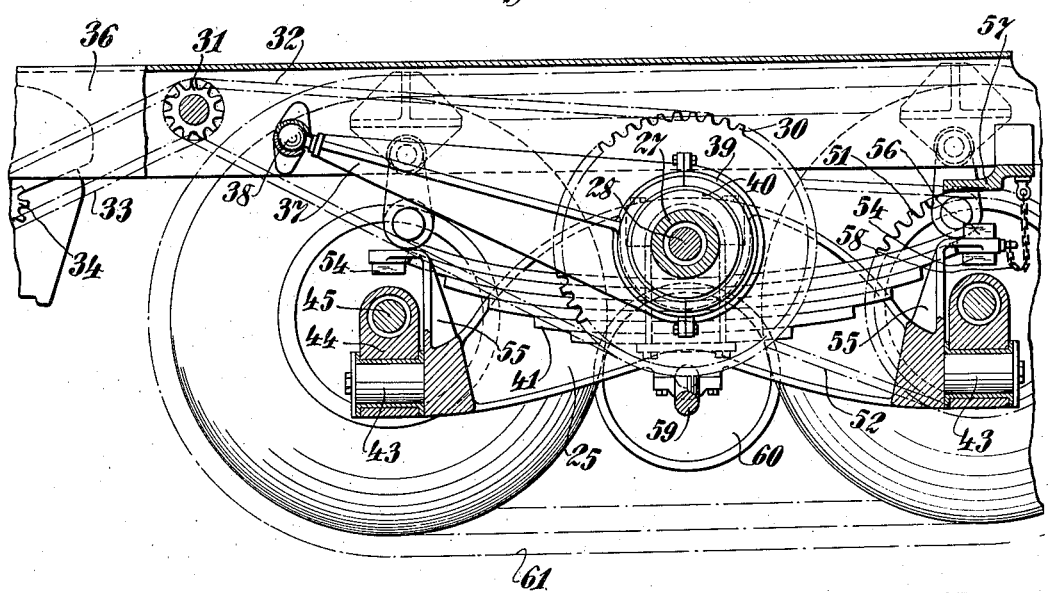
Figure 4 is a view in section, taken on line 4—4 of Figure 3, and looking in the direction of the arrows.
Figure 5:
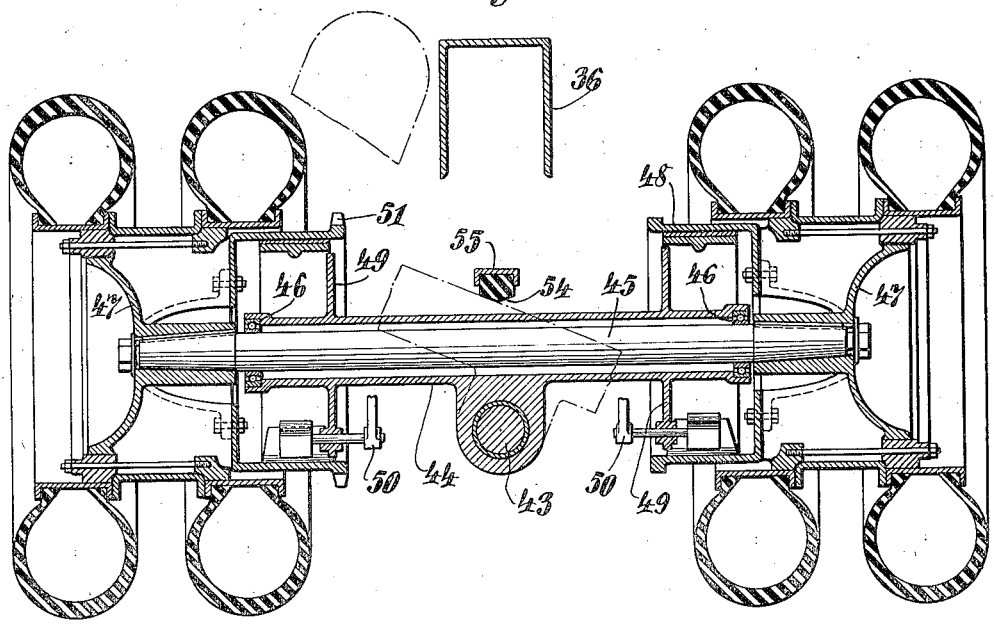
Figure 5 is a view in section, taken on line 5—5 of Figure 3, and looking in the direction of the arrows.
Figure 6:
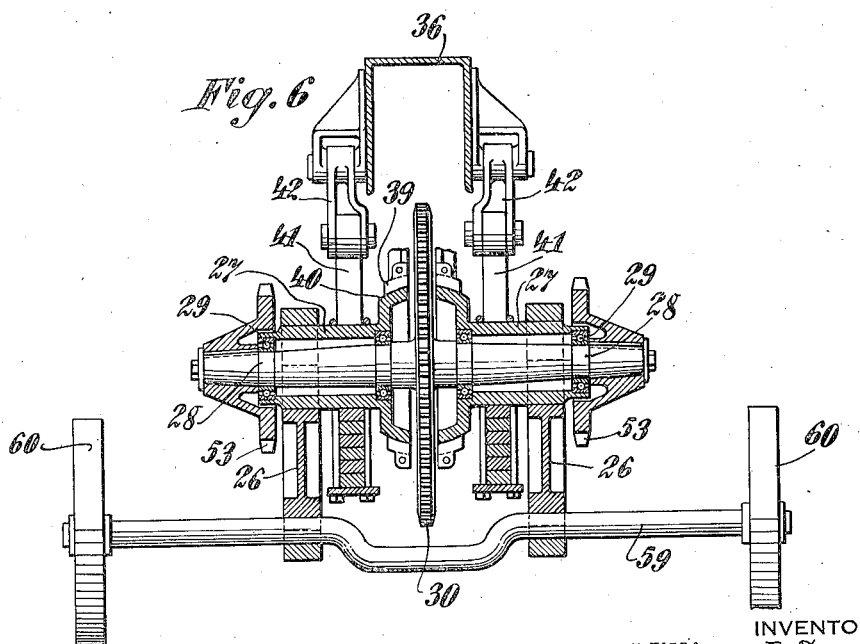
Figure 6 is a view in section, taken on line 6—6 of Figure 3, and looking in the direction of the arrows.

With reference to the form of the invention shown in Figures 1 and 2, 11 indicates brackets which are mounted upon a motor vehicle frame and provided with bifurcations 12 adjacent the lower extremities thereof. An anchor tube 13 is secured in the bifurcations 12 of the brackets 11 and journals beams 14 intermediate the ends of the latter. Beams 14 lie between the bifurcations 12 upon the respective brackets 11 and are provided, adjacent the outer extremities thereof, with bearing portions 15 upon which brackets 16 are journaled. Nuts 17 may be provided to secure the brackets 16 in position and shafts 18 are mounted in the brackets 16. The ends of shafts 18 are provided with spaced bearings 19 upon which wheels 20 are journaled, the wheels 20 being provided with single or dual tires, as good practise dictates.

Extensions 21 are provided with overlying plates 22, upon which pads of cushioning material 23 are secured to cushion rocking movement of shaft 18 about the axis of bearing members 15, and limit the extent thereof. Pads of yielding non-metallic material 24 are mounted within the bights of the bifurcated brackets 11 to limit the rocking movement of arms 14 about the axis of tube 13.

From the foregoing it will be seen that each wheel upon the extremities of the shafts 18 receives a predetermined uniform portion of the weight of the vehicle, inasmuch as it may move about longitudinal axes at right angles to each other.

In the construction shown in Figures 3, 4, 5 and 6, the arms upon which the wheels are mounted are shown at 25. These arms are formed with spaced parallel portions 26 within which a sleeve 27 is secured. Sleeve 27 journals a through axle 28, bearings 29 being provided for this purpose. Axle 28 is provided with a sprocket wheel 30 which receives power from a driving sprocket 31, through a suitable chain, shown in dot and dash lines at 32. Driving sprocket 31 may be driven in any suitable fashion, as indicated in Figure 3, wherein a chain 33 receives power from a sprocket 34 which is driven by a suitable final drive mechanism 35 upon the vehicle frame.

The side frame members of the vehicle are shown at 36 and preferably are U-shaped in cross section to receive the driving sprockets above described. In order that the wheel mounting may be properly spaced from the adjacent frame member 36, a distance rod 37 is provided, being mounted upon the frame by a ball mounting 38 and provided, at its distant end, with split bearing portions 39, which are journaled upon cooperating bearing surfaces 40 of the tube members 27.

The weight of the frame is applied to the tube members 27 through parallel springs 41, which are suitably shackled at 42 to the sides of the frame members. The springs are thus shown as being received between the parallel portions 26 of the arms 25, the latter being formed with a sufficient bow in the sides thereof to accommodate the elements previously described.

Upon the ends of the arms 25, bearing shafts 43 are provided, drive shaft housings 44 being journaled thereon to rock about the longitudinal axes of the bearing shafts 43. Within the housings 44, transverse drive shafts 45 are journaled, bearings 46 being provided for this purpose. Upon the ends of the shafts 45, wheels 47 are secured, the wheels being provided either with single or dual tires, as desired. Brake drums 48 are secured to the wheels and the housings 44 are provided with spiders 49 upon which brake operating mechanism 50 may be mounted. One of the brake drums 48 upon the wheels secured to each of the shafts 45 is provided with sprocket teeth 51, which are adapted to be connected by means of suitable chains 52 (indicated in dot and dash lines in Figure 3), these chains being driven by driving sprockets 53, which are secured to the ends of the shafts 28.

To limit the rocking movement of the housings 44, pads of yielding non-metallic material 54 are secured upon brackets 55 which are formed upon the ends of the arms 25 and rocking movement of the arms 25 is limited by the engagement of a pad 56, upon one of the brackets 55, with a bearing pad 57 which is mounted upon the frame of the vehicle over a cooperating pad 56. A chain 58, secured between the bearing pad 57 and the adjacent bracket 55, limits the extent of motion of the adjacent end of an arm 25 away from the bearing pad 57.

The parallel portions 26 of arms 25 are provided with a cross shaft 59, upon the ends of which idler wheels 60 are journaled. These idler wheels are journaled intermediate the shafts 45 and in such fashion that the lower extremities of the wheels are spaced from the track 61. The idler wheels 60 are furthermore journaled in vertical planes which pass between the planes of the dual wheels which are secured to the ends of shafts 45. In this fashion the idler wheels 60 cooperate with the track mechanism to be described hereinafter to afford an auxiliary supporting mechanism therefor.

In order that the traction afforded by the foregoing wheel units may be improved, when desired, an endless track 61 (indicated in dash and dot lines in Figure 4) may be mounted over the wheels secured to the respective ends of the shafts 45.

From the foregoing it will be seen that a wheel unit has been provided wherein a plurality of wheels may be mounted upon a vehicle in such fashion as to have the vehicle load apportioned therebetween uniformly during all operating conditions. Furthermore, such wheels may be provided with a suitable driving mechanism in order that the vehicle may be driven thereby.

While the invention has been described with specific reference to the construction shown in the accompanying drawings, it is not to be limited save as defined in the appended claims.

I claim as my invention:

1. An attachment for wheels comprising a bar, means to journal the bar on a vehicle intermediate the ends thereof and upon an axis transverse to the vehicle, shafts journaled intermediate the ends thereof upon the ends of the bar, means to journal the shafts upon longitudinal axes upon the bar parallel to the bar, wheels mounted upon the ends of the shafts, and means on the bar to limit yieldingly the movement of the shafts about the longitudinal axes.

2. An attachment for vehicles comprising a bar, means to journal the bar on a vehicle intermediate the ends thereof, shafts journaled intermediate the ends thereof on the bar, means to journal the shafts on the bar on axes parallel to the bar, wheels mounted on the ends of the shafts, and means on the bar and shafts to transmit driving forces to the latter.

3. An attachment for vehicles comprising a bar, means to journal the bar on a vehicle intermediate the ends thereof, shafts journaled intermediate the ends thereof on the bar, means to journal the shafts on the bar on axes parallel to the bar, wheels mounted on the ends of the shafts, means concentric with the journal mounting of the bar to receive driving forces from the vehicle, and means to transmit driving forces from the last named means to the shafts.

4. An attachment for vehicles comprising a bar having spaced side portions intermediate the ends thereof, means to journal the spaced portions transversely of the vehicle, shafts journaled upon the ends of the bar for movement about a longitudinal axis, wheels on the ends of the shafts, a shaft section journaled upon the bar coaxial to the first journaling means, a sprocket wheel on the shaft section between the sides of the bar, and means to transmit driving forces from the shaft section to the shafts.

5. An attachment for vehicles comprising a bar having spaced side portions intermediate the ends thereof, means to journal the spaced portions transversely of a vehicle, shafts journaled upon the ends of the bar for movement about a longitudinal axis, wheels on the ends of the shafts, a shaft section journaled upon the bar coaxial to the first journaling means, a sprocket wheel on the shaft section between the sides of the bar, means to transmit driving forces from the shaft section to the shafts, springs on the vehicle and secured between the spaced portions of the bar to the journaling means therefor, and a distance rod secured to the vehicle and to the bar between the spaced side portions thereof.

6. An attachment for vehicles comprising a bar having spaced side portions intermediate the ends thereof, means to journal the spaced portions transversely of a vehicle, shafts journaled upon the ends of the bar for movement about a longitudinal axis, wheels on the ends of the shafts, a shaft section journaled upon the bar coaxial to the first journaling means, a sprocket wheel on the shaft section between the sides of the bar, driving sprockets on the ends of the shaft sections outside of the spaced side portions of the bar, springs on the vehicle and secured between the spaced portions of the bar to the journaling means therefor, and a distance rod secured to the vehicle and to the bar between the spaced side portions thereof.

WILLIAM D. SARGENT.